United States Patent Office
3,226,399
Patented Dec. 28, 1965

3,226,399
SUBSTITUTED 3-FORMYLINDOLES
George Rodger Allen, Jr., Old Tappan, N.J., William Alan Remers, Pearl River, N.Y., and Martin Joseph Weiss, Oradell, N.J., assignors to American Cyanamid Company, Stamford, Conn., a corporation of Maine
No Drawing. Filed Aug. 7, 1964, Ser. No. 388,281
12 Claims. (Cl. 260—319)

This application is a continuation-in-part of our copending application Serial No. 315,672, filed October 11, 1963, now abandoned.

This invention relates to new organic compounds and, more particularly, is concerned with novel substituted 3-acyl and 3-formylindoles and with novel methods of preparing these compounds. The novel substituted 3-acyl and 3-formylindoles of the present invention may be represented by the following general formula:

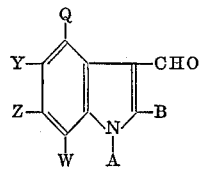

wherein A is hydrogen, lower alkyl, ω-(hydroxy)lower alkyl, ω-(lower alkylsulfonyloxy)lower alkyl, ω-(halo) lower alkyl, ω-(azido)lower alkyl, ω-(thiocyano)lower alkyl, ω-(lower alkanoyloxy)lower alkyl or ω-(lower alkylthio)lower alkyl; B is hydrogen, lower alkyl, lower alkoxycarbonyl, carboxy, carboxamido, lower alkanoyloxymethyl or hydroxymethyl; Q is nitro, amino, hydroxy or lower alkanoyloxy; Y is hydrogen, hydroxy, lower alkyl or lower alkoxy; Z is hydrogen or lower alkyl; and W is hydrogen, hydroxy or lower alkanoyloxy; with the proviso that when Q is nitro, then Y is lower alkoxy. Suitable lower alkyl, lower alkoxy and lower alkanoyl groups contemplated by the present invention are those having up to about 6 carbon atoms. Suitable ω-substituted lower alkyl groups are those having from 2 to 4 carbon atoms while halogen is exemplified by fluorine and chlorine.

The novel compounds of the present invention are obtainable as crystalline materials having characteristic melting points and absorption spectra. They are appreciably soluble in many organic solvents such as lower alkanols, acetone, ethyl acetate, and the like. They are, however, generally insoluble in water.

The novel substituted 3-acyl and 3-formylindoles of the present invention are useful as intermediates in the preparation of the biologically active 3-(α-carbamoyloxyalkyl)-4,7-indoloquinones and 3-(α-acyloxyalkyl)-4,7-indoloquinones as is set forth in greater detail in the copending applications of Allen et al., Ser. Nos. 315,710 (now abandoned); 315,695, and 315,674, filed October 11, 1963. For example, a 3-acyl or 3-formyl-5-hydroxyindole may be converted into a 4,5-ortho-quinone by any of several methods well known to the art for the conversion of a phenol into an ortho-quinone. Particularly useful for this transformation is potassium nitrosodisulfonate (Fremy's salt) which accomplishes this conversion in one step. Conversion of the ortho-quinone into the 4,7-para-quinone is achieved via an intermediate 4,5,7-lower alkanoyloxyindole prepared by treating the ortho-quinone with a lower alkanoyl anhydride and a strong acid such as boron trifluoride. The triacyloxyindoles then may be hydrolyzed to the corresponding trihydricphenols, which on oxidation with air or other oxidizing agents, furnish the corresponding 5-hydroxy-4,7-para-quinone. The 5-hydroxy-4,7-para-quinones may be O-alkylated to give the corresponding 5-alkoxy-4,7-para-quinones; of particular value for this conversion are the dialkyl sulfates and tetra-alkoxymethanes. Reduction of the 5-alkoxy-4,7-para-quinones, followed by oxidation of the hydroquinone thus formed, gives the 3-(α-hydroxyalkyl)-4,7-para-quinones. Sodium borohydride is particularly useful for this reduction.

In the case of the 3-acyl and 3-formyl-4-nitroindoles, hydrogenation in the presence of a noble metal catalyst gives the corresponding 4-amino-3-(α-hydroxyalkyl) indoles which on treatment with an oxidizing agent such as Fremy's salt gives the corresponding 3-(α-hydroxyalkyl)-4,7-indoloquinones.

In the case of the 3-acyl and 3-formyl-4-lower alkanoyloxyindoles, removal of the O-acyl group by treatment with base gives the corresponding 4-hydroxy derivatives. These 3-acyl and 3-formyl-4-hydroxyindoles may be treated with an oxidizing agent, for example, Fremy's salt to give the corresponding 3-substituted-4,7-indoloquinones. In the manner described previously, treatment of the 3-substituted-4,7-indoloquinones with a reducing agent such as sodium borohydride, followed by oxidation of the intermediate hydroquinone with a reagent such as ferric chloride, produces the 3-(α-hydroxyalkyl)-4,7-indoloquinones.

Treatment of a 3-(α-hydroxyalkyl)-4,7-indoloquinone with an acylating agent furnishes the corresponding 3-(α-acyloxyalkyl)-4,7-indoloquinone derivative. Treatment of a 3-(α-hydroxyalkyl)-4,7-indoloquinone with a lower alkyl chloroformate or phenyl chloroformate gives rise to the corresponding 3-(α-alkoxycarbonyloxyalkyl)- or 3-(α-phenoxycarbonyloxyalkyl)-4,7-indoloquinone derivative. The phenyl carbonate esters are particularly useful for the preparation of certain of the 3-(α-carbamoyloxyalkyl)-4,7-indoloquinones. Thus, upon treatment of the phenyl carbonate esters with a lower alkyl amine there is obtained the corresponding 3-(α-alkylcarbamoyloxyalkyl)-5-alkylamino-4,7-indoloquinone, while treatment with ammonia or a di(lower alkyl)amine is productive of the 3-(α-carbamoyloxyalkyl)- and 3-(α-dialkylcarbamoyloxyalkyl)-4,7-indoloquinone derivatives. Moreover, other 3-(α-carbamoyloxyalkyl)-4,7-indoloquinones may be prepared by the treatment of a 3-(α-hydroxyalkyl)-4,7-indoloquinone with a lower alkyl, lower alkenyl, or aryl isocyanate, or with a diphenyl carbamoyl chloride.

The novel 3-acyl and 3-formylindoles of the present invention may be prepared in several ways, principally in accordance with the following reaction schemes:

FLOWSHEET A

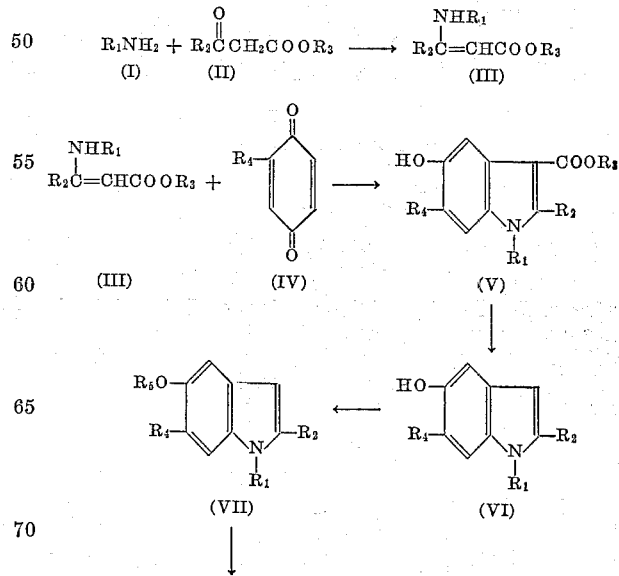

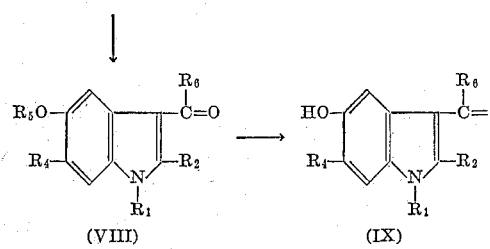

(VIII) → (IX)

wherein $R_2$, $R_3$, $R_4$ and $R_5$ are lower alkyl and $R_1$ and $R_6$ are hydrogen or lower alkyl. In accordance with this reaction scheme, the indole system (V) is developed by condensation of a substituted 1,4-benzoquinone (IV) with a substituted amino-crotonate ester (III). The latter reagent is prepared by the interaction of an appropriate amine (I) with a β-ketoester (II). The resulting 5-hydroxy-3-indolecarboxylic ester (V) may be converted into other useful 5-hydroxyindoles (IX). Thus, decarbalkoxylation of the 3-indolecarboxylic ester (V) gives the hydroxyindoles (VI); a particularly useful reagent for this transformation being hydrochloric acid. The resulting 5-hydroxyindole (VI) is then O-alkylated to furnish the 5-alkoxyindole (VII). Treatment of this product with phosphorus oxychloride and dimethylformamide or with an alkanoyl anhydride and alkali metal alkanoate affords the corresponding 3-carboxaldehyde or 3-acyl derivative (VIII). The ether function in this class of compounds is then cleaved to give the important 5-hydroxyindoles (IX); this cleavage may be effected with hydriodic acid or aluminum chloride in boiling xylene.

As set forth in the following reaction scheme:

FLOWSHEET B

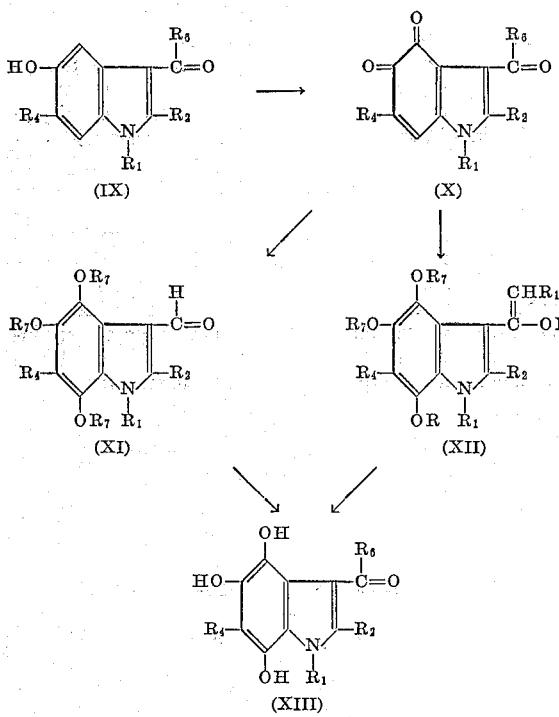

wherein $R_1$, $R_2$, $R_4$ and $R_6$ are lower alkyl and $R_7$ is lower alkanoyl; the previously described 5-hydroxyindoles (IX) may be converted into 4,5-orthoquinones (X) by any of several methods well known to the art for the conversion of a phenol into an ortho-quinone. Particularly useful for this transformation is potassium nitrosodisulfonate (Fremy's salt) which accomplishes this conversion in one step. Conversion of an ortho-quinone (X) into the trihydric indole (XIII) is achieved via an intermediate 4,5,7-lower alkanoyloxyindole (XI or XII), prepared by treating the ortho-quinone with a lower alkanoyl anhydride and a strong acid such as boron trifluoride. When the ortho-quinone (X) contains a 3-acyl substituent, concomitant enol acylation of the carbonyl group occurs to give (XII). The triacyloxyindoles (XI and XII) then may be hydrolyzed to the corresponding trihydric 3-acyl and 3-formylindoles (XIII).

As set forth in the following reaction scheme:

FLOWSHEET C

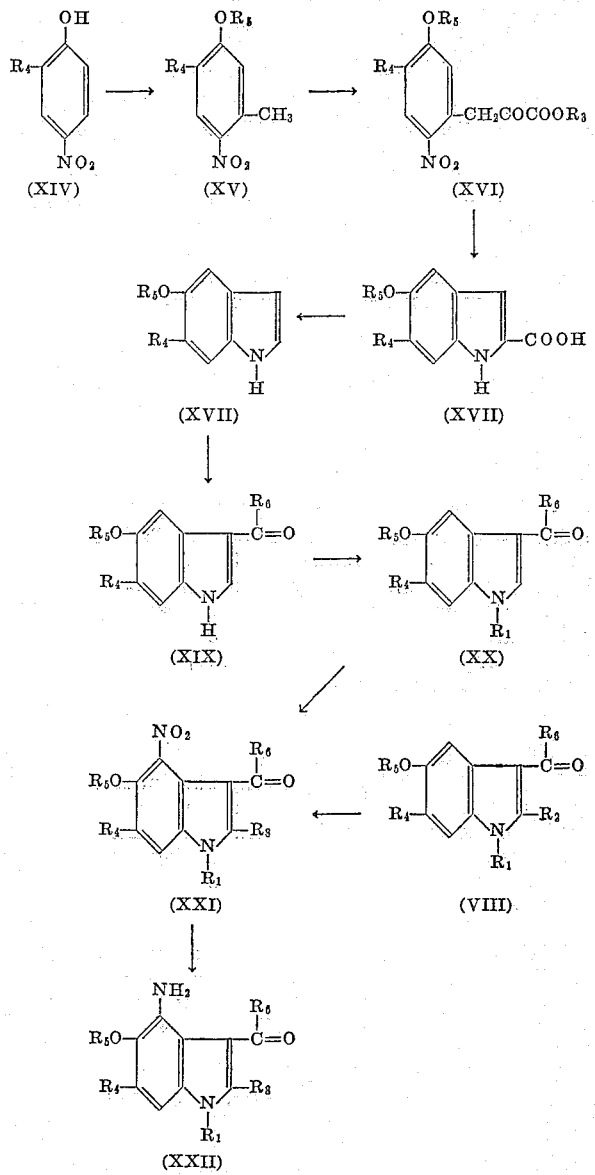

wherein $R_1$, $R_2$, $R_3$, $R_4$ and $R_5$ are lower alkyl; and $R_6$ and $R_8$ are hydrogen or lower alkyl, an ortho-alkyl-para-nitro meta-cresol (XIV) is treated with an alkylating agent such as an alkyl halide or dialkyl sulfate in the presence of base to give the alkyl aryl ether (XV). Base-catalyzed acylation of (XV) with a dialkyl oxalate affords the glyoxylic ester (XVI). Reductive cyclization of this ester furnishes a 6-alkyl-5-alkoxy-2-indolecarboxylic acid (XVII); this reductive cyclization may be achieved with zinc dust in acetic acid, ferrous ammonium sulfate, sodium hydrosulfite or the like. Decarboxylation of the acid (XVII) then gives the indole (XVIII) which on treatment with phosphorous oxychloride and dimethylformamide or a dimethylalkanoylamide furnishes the 3-formyl- or 3-acylindole (XIX). On treatment with a strong base such as potassium hydroxide or sodium hydride and an alkylating agent such as an alkyl halide or a dialkyl sulfate, the 3-formyl and 3-acylindoles (XIX)

afford the corresponding 1-alkyl derivatives (XX). These compounds (VIII and XX) are converted into their 4-nitro derivatives (XXI) by the action of an alkali metal nitrate in sulfuric acid or fuming nitric acid in acetic acid. The 4-nitro derivatives (XXI) are converted into their 4-amino derivatives (XXII) by the action of a reducing agent such as ferrous ammonium sulfate, iron in acetic acid or the like.

Certain of the novel 3-acyl and 3-formylindoles may also be obtained in accordance with the following reaction scheme:

last compounds may be transformed into trihydric 3-acyl and 3-formylindoles having a 2-carboalkoxy substituent in accordance with procedures outlined in Flowsheet B. The 4-nitroindoles (XXVIII) may also be converted into 3-acyl and 3-formylindoles containing a 2-carboalkoxy substituent as illustrated in Flowsheet C. Additionally, the 4-nitroindoles (XXVIII) are hydrolyzed by methanolic solutions of inorganic bases to give the 4-nitroindole acids (XXX), which are converted into the amides (XXI). The latter conversion is best effected by conversion of the acids (XXX) into a mixed carbonic acid anhydride,

FLOWSHEET D

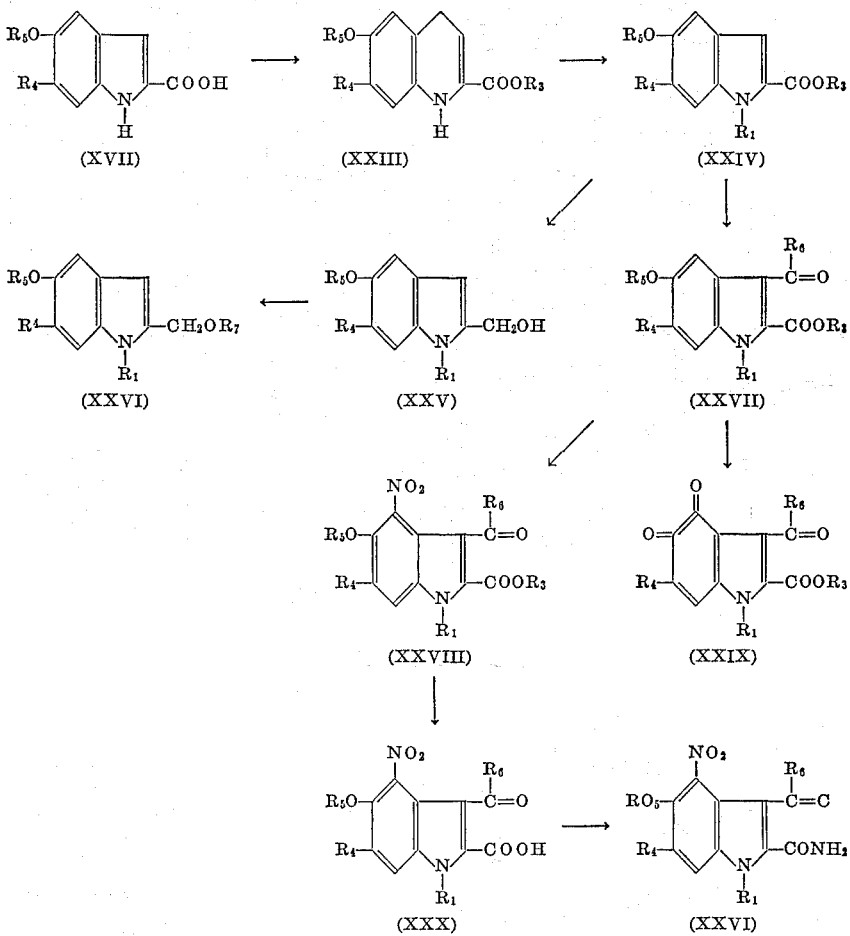

wherein $R_1$ and $R_6$ are hydrogen or lower alkyl; $R_3$, $R_4$ and $R_5$ are lower alkyl; and $R_7$ is lower alkanoyl. In accordance with this flowsheet, esterification of the acids of type XVII (Flowsheet C) gives the corresponding ester (XXIII). Upon treatment with an organic base and a lower alkyl sulfate these esters are converted into the corresponding N-alkyl compounds (XXIV). Reduction of the latter compounds with lithium aluminum hydride gives the corresponding 2-indolylmethanols (XXV), which on treatment with a lower alkanoic acid anhydride in pyridine are transformed into compounds of type XXVI. These last compounds may be converted into the novel 3-acyl and 3-formylindoles as described in Flowsheets A and C. In this conversion, the 4-nitroindole (corresponding to XXI) undergoes concomitant deacylation upon reduction to the 4-aminoindole (corresponding to XXII).

Alternatively, the indole esters (XXIX) of Flowsheet D may be converted into their 3-formyl or 3-acyl derivatives (XXVII) by phosphorous oxychloride and dimethylformamide or dimethylalkanoyl amide. Upon treatment with fuming nitric acid in glacial acetic acid the compounds of type XXVII give the 4-nitroindoles (XXVIII) in mixture with the 4,5-indoloquinones (XXIX). These which on treatment with ammonia gives the amides (XXI).

Certain of the 3-acyl and 3-formylindoles of this invention may be obtained in accordance with the following reaction scheme:

FLOWSHEET E

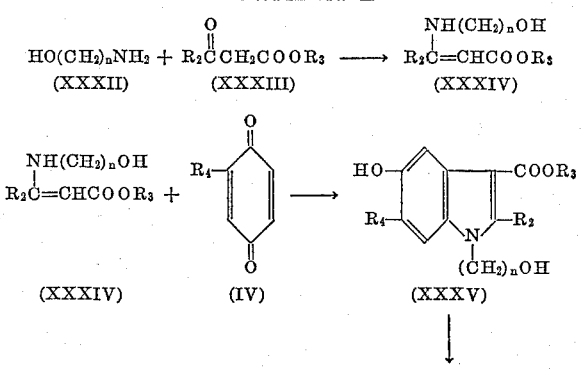

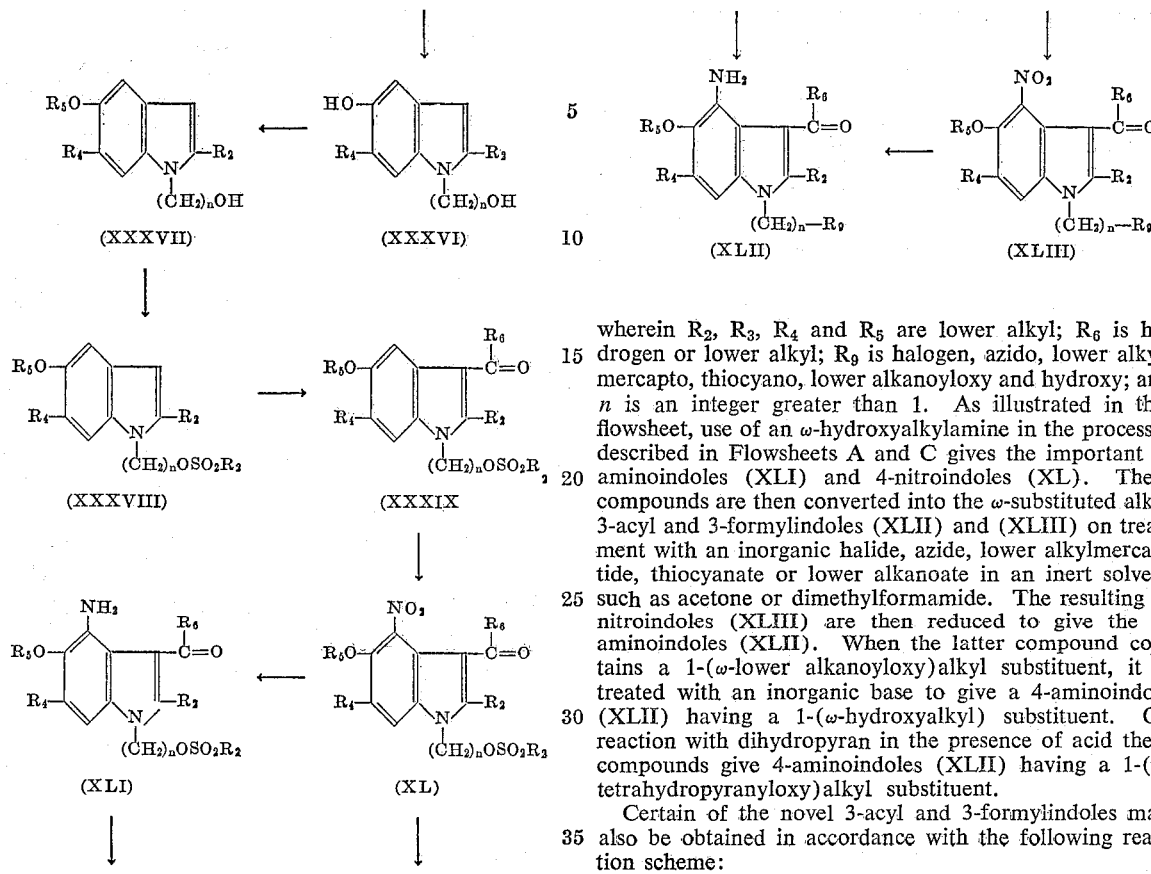

wherein $R_2$, $R_3$, $R_4$ and $R_5$ are lower alkyl; $R_6$ is hydrogen or lower alkyl; $R_9$ is halogen, azido, lower alkylmercapto, thiocyano, lower alkanoyloxy and hydroxy; and $n$ is an integer greater than 1. As illustrated in this flowsheet, use of an ω-hydroxyalkylamine in the processes described in Flowsheets A and C gives the important 4-aminoindoles (XLI) and 4-nitroindoles (XL). These compounds are then converted into the ω-substituted alkyl 3-acyl and 3-formylindoles (XLII) and (XLIII) on treatment with an inorganic halide, azide, lower alkylmercaptide, thiocyanate or lower alkanoate in an inert solvent such as acetone or dimethylformamide. The resulting 4-nitroindoles (XLIII) are then reduced to give the 4-aminoindoles (XLII). When the latter compound contains a 1-(ω-lower alkanoyloxy)alkyl substituent, it is treated with an inorganic base to give a 4-aminoindole (XLII) having a 1-(ω-hydroxyalkyl) substituent. On reaction with dihydropyran in the presence of acid these compounds give 4-aminoindoles (XLII) having a 1-(ω-tetrahydropyranyloxy)alkyl substituent.

Certain of the novel 3-acyl and 3-formylindoles may also be obtained in accordance with the following reaction scheme:

FLOWSHEET F

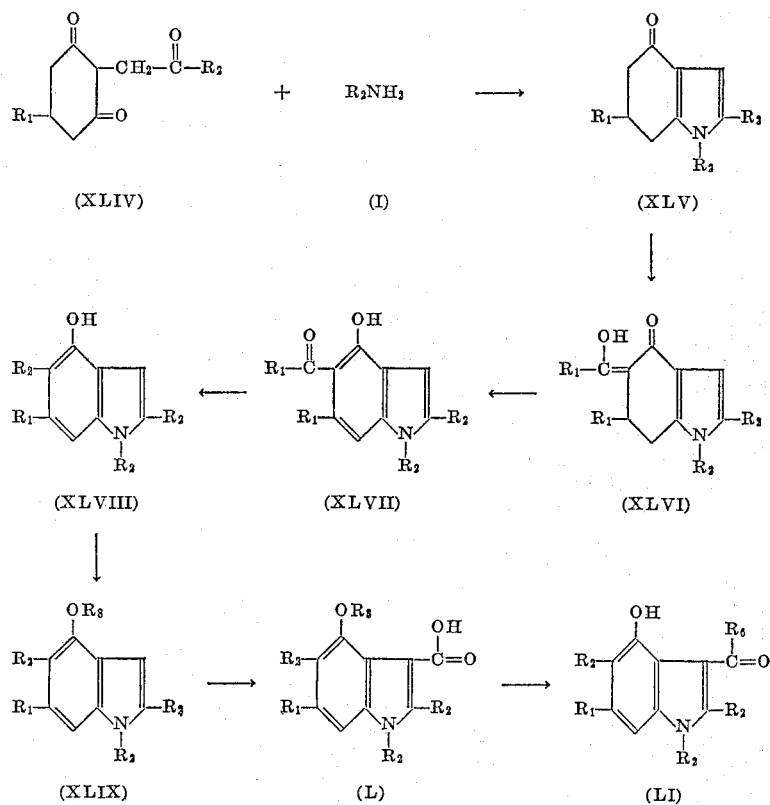

wherein $R_1$ and $R_6$ are hydrogen or lower alkyl, $R_2$ and $R_5$ are lower alkyl and $R_8$ is lower alkanoyl. Thus, reaction of an appropriate alkylamine (I) with a triketone of type (XLIV) is productive of a 4-oxo-4,5,6,7-tetrahydroindole (XLV). Base-catalyzed acylation of the 4-oxotetrahydroindole (XLV) furnishes the corresponding 5-formyl or 5-acyl-4-oxotetrahydroindole (XLVI), shown in Flowsheet F in one of the two possible enolic forms. Dehydrogenation of (XLVI), preferably on treatment with 2,3-dichloro-5,6-dicyanobenzoquinone, affords the 5-acyl-4-hydroxyindoles (XLVII), catalytic hydrogenation of which, preferably in the presence of palladium-on-carbon catalyst, then furnishes the 5-alkyl-4-hydroxyindole (XLVIII). After esterifying (for example, with acetic anhydride) the 4-hydroxy group in (XLVIII) to give (XLIX), the 3-formyl or a 3-acyl group can be introduced. For example, on treatment of (XLIX) with phosphorous oxychloride and dimethylformamide the 3-formyl derivative is obtained. The 3-formyl- or 3-acyl-4-alkanoyloxyindoles (L) can be converted to the corresponding 4-ols (LI) on base treatment.

Certain of the 3-acyl and 3-formylindoles may be prepared in accordance with the following reaction scheme:

FLOWSHEET G

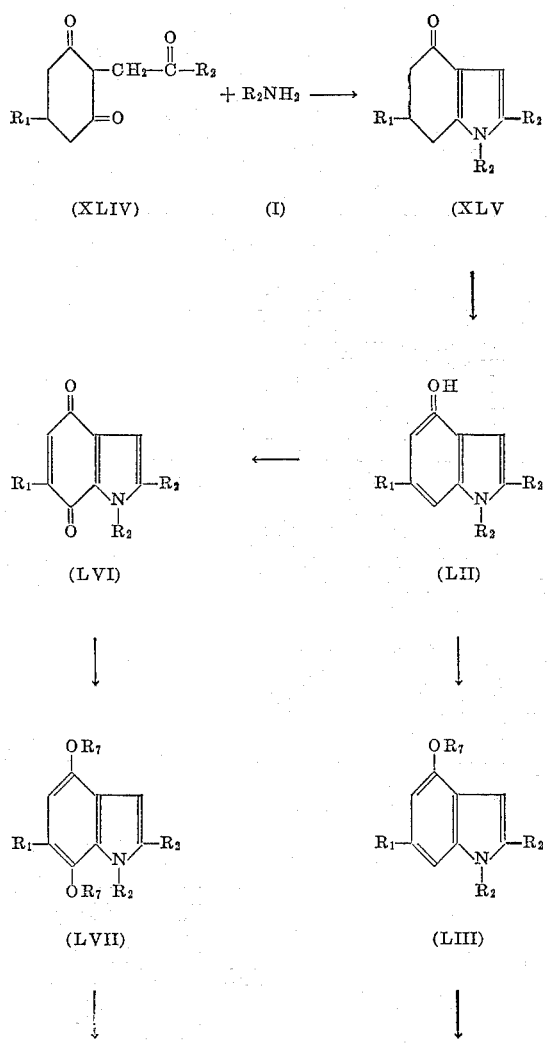

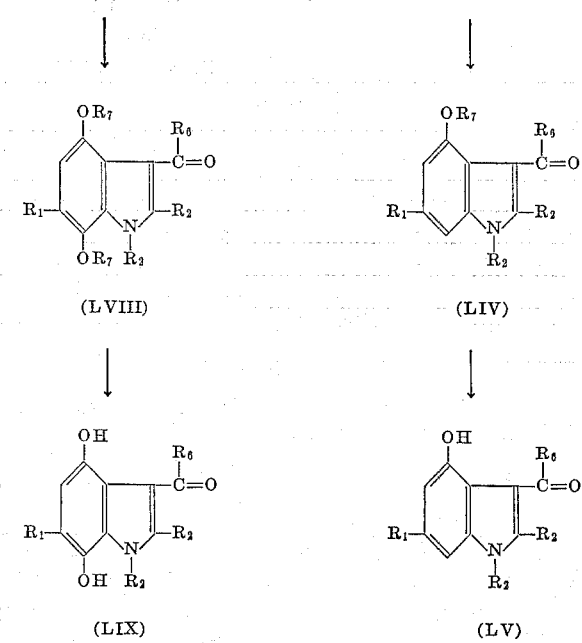

wherein $R_1$ and $R_6$ are hydrogen or lower alkyl, $R_2$ is lower alkyl and $R_7$ is lower alkanoyl. Treatment of the 4-oxotetrahydroxyindoles (XLV) with a dehydrogenating agent such as palladium in boiling cumene furnish the 4-hydroxyindoles (LII), which are converted into the 4-acyloxyindoles (LIII) on treatment with an alkanoyl anhydride. These acyloxyindoles (LIII) may then be converted into their 3-formyl or 3-acyl derivatives (LIV) by any of several methods known to those skilled in the art. For example, on reaction with phosphorous oxychloride and dimethylformamide the 3-formyl derivative is obtained. After removal of the O-acyl group by treatment with base, the 4-hydroxy-3-formyl or 3-acylindoles (LV) result.

Other novel 3-acyl or 3-formylindoles (LVII) may also be prepared from the 4-hydroxyindole (LII) as follows. Oxidation of (LII) with Fremy's salt affords the para-quinone (LVI) which on reductive alkanoylation, for example on treatment with zinc, acetic anhydride and pyridine, gives the 4,7-bisalkanoyloxy derivative (LVII). As described previously, the latter compounds (LVII) may be converted to the 3-formyl or 3-acyl derivatives (LVIII), which on basic hydrolysis gives the 4,7-diol (LIX).

The invention will be described in greater detail in conjunction with the following specific examples.

*Example 1*

*Preparation of ethyl β-ethylaminocrotonate.*—With mechanical stirring a stream of ethylamine is introduced into 98.5 g. (100 ml.) of ethyl acetoacetate for 3 hours. During the first hour cooling is required to hold the temperature at 35–40° C. where it is maintained throughout the reaction. Ether (200 ml.) is added, and the water is separated. The ether is removed from the organic phase and the residue is distilled under reduced pressure to give a water white liquid, B.P. 20 mm. 116–118° C., $n_D^{25}$ 1.4941, 104 g.

*Examples 2–6*

By the procedure described in Example 1 the compounds of Table I are obtained.

TABLE I $$\underset{R_2C=CHCOOC_2H_5}{NHR_1}$$

| Example No. | Starting Materials | | Product | | B.P., °C. (pressure) |
|---|---|---|---|---|---|
| | Ester | Amine | $R_1$ | $R_2$ | |
| 2 | Ethyl acetoacetate | Propyl amine | $C_3H_7$ | $CH_3$ | 119–119.5 (14 mm.). |
| 3 | do | i-Propyl amine | $(CH_3)_2CH$ | $CH_3$ | 106–106.5 (11 mm.). |
| 4 | do | Butyl amine | $C_4H_9$ | $CH_3$ | 129.5–131.0 (14 mm.). |
| 5 | do | Ethanolamine | $CH_2CH_2OH$ | $CH_3$ | Decomposes. |
| 6 | Ethyl propionylacetate | Ethyl amine | $C_2H_5$ | $C_2H_5$ | 118–121 (14 mm). |

*Example 7*

*Preparation of ethyl 1-ethyl-5-hydroxy-2,6-dimethyl-3-indolecarboxylate.*—A solution of 122 g. (0.0855 mole) of ethyl β-ethylaminocrotonate (Example 1) in 60 ml. of acetone is thoroughly swept with nitrogen and treated with 10.9 g. (0.0895 mole) of toluquinone. The deep red solution is heated on the steam-bath for 2 hours, cooled in an ice-bath and filtered to give a dark solid. This material is washed with cold acetone and dried to give 4.45 g. of gray crystals. The combined filtrate and washings are concentrated to about 50 ml. volume and placed in the refrigerator for 16 hours. The solid is collected by filtration and washed with boiling light petroleum to give an additional 3.90 g. of crystals. A sample is recrystallized from dilute ethanol containing a trace of sodium hydrosulfite to give off-white crystals, M.P. 196–198° C.

*Examples 8–14*

In the manner described in Example 7 the compounds of Table II are prepared.

*Example 15*

*Preparation of 1-ethyl-5-hydroxy-2,6-dimethylindole.*— A mechanically stirred mixture of 50.0 g. of ethyl 1-ethyl-5-hydroxy-2,6-dimethyl-3-indolecarboxylate (Example 7) and 500 ml. of 20% hydrochloric acid solution is heated at reflux temperature for 2 hours. The acid solution is diluted with 500 ml. of water, saturated with sodium chloride and extracted well with ethyl acetate. The extracts are dried over magnesium sulfate and evaporated. The residue crystallizes from methylene chloride-petroleum ether (B.P. 30–60°) to give 26.0 g. of crystals, M.P. 113–117° C. An additional 4.8 g. of crystals is obtained by concentration of the mother liquor. This material also has a crystalline modification that melts at 90–92° C. Both forms have identical infrared spectra in carbon tetrachloride solution.

TABLE II

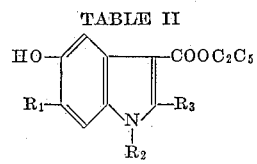

| Example No. | Starting Materials | | Product | | | M.P.,[a] °C. |
|---|---|---|---|---|---|---|
| | | | $R_1$ | $R_2$ | $R_3$ | |
| 8 | Ethyl β-methylaminocrotonate [b] | Toluquinone | $CH_3$ | $CH_3$ | $CH_3$ | 222–225 |
| 9 | Product of Example 2 | do | $CH_3$ | $C_3H_7$ | $CH_3$ | 193.5–195.0 |
| 10 | Product of Example 3 | do | $CH_3$ | $(CH_3)_2CH$ | $CH_3$ | 202–203 |
| 11 | Product of Example 4 | do | $CH_3$ | $C_4H_9$ | $CH_3$ | 176–177 |
| 12 | Product of Example 5 | do | $CH_3$ | $CH_2CH_2OH$ | $CH_3$ | 196.0–197.5 |
| 13 | Product of Example 6 | do | $CH_3$ | $C_2H_5$ | $C_2H_5$ | 164–166 |
| 14 | Product of Example 1 | Ethylbenzoquinone [c] | $C_2H_5$-8 | $C_2H_5$ | $CH_3$ | 207–208 |

[a] All products are recrystallized from acetone-hexane.
[b] S. A. Glickman and A. C. Cope, J. Am. Chem. Soc. 67, 1019 (1945).
[c] Clemmensen, Ber., 47, 56 (1914).

*Examples 16–22*

In the manner described in Example 15 the compounds of Table III are obtained.

TABLE III

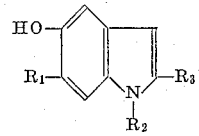

| Example No. | Starting Material | Product | | | M.P.,[a] °C |
|---|---|---|---|---|---|
| | | $R_1$ | $R_2$ | $R_3$ | |
| 16 | Product of Example 8 | $CH_3$ | $CH_3$ | $CH_3$ | 130.0–131.5 |
| 17 | Product of Example 9 | $CH_3$ | $C_3H_7$ | $CH_3$ | 125–128 |
| 18 | Product of Example 10 | $CH_3$ | $(CH_3)_2CH$ | $CH_3$ | 94–95 |
| 19 | Product of Example 11 | $CH_3$ | $C_4H_9$ | $CH_3$ | 73.5–75.0 |
| 20 | Product of Example 12 | $CH_3$ | $CH_2CH_2OH$ | $CH_3$ | 121–123 |
| 21 | Product of Example 13 | $CH_3$ | $C_2H_5$ | $C_2H_5$ | 88–90 |
| 22 | Product of Example 14 | $C_2H_5$ | $C_2H_5$ | $CH_3$ | 80.5–81.5 |

[a] All products are recrystallized from methylene chloride-petroleum ether (B.P. 30–60° C.).

Example 23

*Preparation of 1-ethyl-5-methoxy-2,6-dimethylindole.*—To a magnetically stirred solution of 49.1 g. of 1-ethyl-5-hydroxy-2,6-dimethylindole (Example 15) in 300 ml. of ethyl alcohol and 600 ml. of 2 N sodium hydroxide solution is added dropwise over 90 min. at reflux temperature under nitrogen 100 g. (74 ml.) of methyl sulfate. The resulting mixture is heated at reflux temperature for an additional 60 minutes and then extracted with ethyl acetate. The extract is washed with saline, dried over magnesium sulfate and evaporated. The residual brown oil is dissolved in benzene and passed through a magnesia-silica gel column (1.0 x 12.5 in.), benzene being used as the eluting solvent and 250 ml. fractions being collected. Fraction 1 contains 46.9 g. of amber oil and fraction 2 contains 1.0 g. These fractions crystallize on standing. A sample of this material is recrystallized from hexane to give white crystals, M.P. 56–57° C.

Examples 24–31

By the procedure given in Example 23 the compounds of Table IV are obtained.

TABLE IV

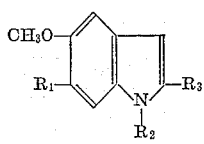

| Example No. | Starting Material | Product | | | State |
|---|---|---|---|---|---|
| | | $R_1$ | $R_2$ | $R_3$ | |
| 24 | 5-hydroxy-2,6-dimethylindole a | $CH_3$ | H | $CH_3$ | Solid, M.P. 94–96° C. |
| 25 | Product of Example 16 | $CH_3$ | $CH_3$ | $CH_3$ | Solid, M.P. 75–77° C. |
| 26 | Product of Example 17 | $CH_3$ | $C_3H_7$ | $CH_3$ | Oil. |
| 27 | Product of Example 18 | $CH_3$ | $(CH_3)_2CH$ | $CH_3$ | Oil. |
| 28 | Product of Example 19 | $CH_3$ | $C_4H_9$ | $CH_3$ | Oil. |
| 29 | Product of Example 20 | $CH_3$ | $CH_2CH_2OH$ | $CH_3$ | Solid, M.P. 78–80° C. |
| 30 | Product of Example 21 | $CH_3$ | $C_2H_5$ | $C_2H_5$ | Oil. |
| 31 | Product of Example 22 | $C_2H_5$ | $C_2H_5$ | $CH_3$ | Oil. | a R.J.S. Beer, et al., J. Chem. Soc., 2029 (1951).

Example 32

*Preparation of 1 - (β - methanesulfonyloxyethyl) - 5-methoxy - 2,6 - dimethylindole.*—To an ice-chilled, magnetically stirred solution of 12.7 g. of 1-(β-hydroxyethyl)-5-methoxy-2,6-dimethylindole (Example 20) in 100 ml. of pyridine is added dropwise 10 ml. of methanesulfonyl chloride. The resulting solution is kept at 0–5° C. for 15 hours; water is then added, and the mixture is extracted with methylene chloride. The combined extracts are washed wtih saline, dried over magnesium sulfate and evaporated. The residue is recrystallized from methylene chloride-petroleum ether (B.P. 30–60°) to give crystals, M.P. 118–120° C. dec.

Example 33

*Preparation of 2,5-dimethyl - 4 - nitroanisole.*—A well stirred suspension of 16.7 g. (0.1 mole) of 2,5-dimethyl-4-nitrophenol (R. L. Datta and P. S. Varma, J. Am. Chem. Soc., 41, 2042 (1919) in 50 ml. of water at 40–45° C. is treated alternately and in portions with a solution of 7.0 g. of sodium hydroxide in 18 ml. of water and 12 ml. of methyl sulfate. After 2 hours the mixture is filtered, and the solid is recrystallized from dilute methanol to give 14.5 g. (80% yield) of needles, M.P. 90–92° C.

Example 34

*Preparation of 5-methoxy-4-methyl - 2 - nitrophenylpyruvic acid.*—Ethanol (6.25 ml.) is added to a mechanically stirred slurry of 2.15 g. (0.055 g.-atoms) of potassium in benzene. After all of the potassium reacts, the solvents are removed by distillation, benzene (50 ml.) is added and removed in the same manner. The cooled residue is slurried in 100 ml. of ether and treated with 7.3 g. (0.05 mole, 6.75 ml.) of ethyl oxalate. To the resulting solution is added a solution of 9.05 g. (0.05 mole) of 2,5-dimethyl-4-nitro-anisole (Example 33) in 150 ml. of ether. A red solid separates immediately and the mixture is mechanically stirred at room temperature for 18 hours and then at reflux temperature for 4 hours. The mixture is filtered, and the solid is washed with ether. The residue is dissolved in water and the solution is heated on the steam-bath for 30 minutes. The solution is cooled and extracted with ether. The aqueous solution is acidified with hydrochloric acid and filtered to give 6.123 g. of crystals, M.P. 167–170° C.

Example 35

*Preparation of 5-methoxy-6-methyl-2-indolecarboxylic acid.*—A solution of 42.0 g. (0.166 mole) of 5-methoxy-4-methyl-2-nitrophenylpyruvic acid (Example 34) in 230 ml. of 17% ammonium hydroxide and 115 ml. of water is treated with a hot solution of 300 g. of ferrous sulfate chanically stirred at steam-bath temperature for 1 hour and then allowed to cool to room temperature and filtered. heptahydrate in 340 ml. of water. The mixture is me- The residue is washed with dilute ammonium hydroxide until a test portion becomes only milky on acidification. The combined filtrate and washings are acidified with hydrochloric acid and the solid which separates is collected by filtration. The moist solid is recrystallized from dilute acetic acid to give 19.0 g. (56% yield) of light brown solid, M.P. 240–242° C. (gas evolution).

Example 36

*Preparation of methyl 5-methoxy-6-methyl-2-indolecarboxylate.*—A solution of 4.00 g. of 5-methoxy-6-methyl-2-indolecarboxylic acid (Example 35) in 100 ml. of methanolic hydrogen chloride is heated at reflux temperature of 16 hours. The solvent is evaporated, and the residue is recrystallized from dilute methanol to give while needles, M.P. 147–149° C.

Example 37

*Preparation of methyl 1-ethyl-5-methoxy-6-methyl-2-indolecarboxylate.*—To a mechanically stirred solution of 15.40 g. of methyl 5-methoxy-6-methyl - 2 - indolecarboxylate (Example 36) in 500 ml. of benzene is added 3.55 of a 50.7% suspension of sodium hydride in mineral oil. Gas evolution is noted almost immediately, and a gray flocculent solid separates. The mixture is heated at reflux temperature for 45 minutes, and then 25 ml. of ethyl sulfate is added over 15 minutes. The resulting mixture is heated at reflux temperature for 4 hours and filtered while hot. The solvent is removed from the filtrate by evaporation, and the excess ethyl sulfate is removed at oil-pump pressure. The residue is agitated with 250 ml. of boiling hexane and filtered. The filtrate is concentrated to about one-half its original volume and chilled to give white needles, M.P. 101–102° C.

about 2.5 l. and cooled. Filtration gives 70.5 g. of crystals, M.P. 134–136° C.

*Examples 41–50*

By the procedure given in Example 40 the compounds of Table V are obtained.

TABLE V

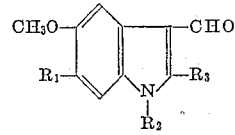

| Example No. | Starting Material | Product | | | M.P., °C. |
|---|---|---|---|---|---|
| | | $R_1$ | $R_2$ | $R_3$ | |
| 41 | Product of Example 24 | $CH_3$ | H | $CH_3$ | 227.0–228.5 |
| 42 | Product of Example 25 | $CH_3$ | $CH_3$ | $CH_3$ | 174–178 |
| 43 | Product of Example 26 | $CH_3$ | $C_3H_7$ | $CH_3$ | 117.5–119.5 |
| 44 | Product of Example 27 | $CH_3$ | $(CH_3)_2CH$ | $CH_3$ | 172–174 |
| 45 | Product of Example 28 | $CH_3$ | $C_4H_9$ | $CH_3$ | 96–97 |
| 46 | Product of Example 30 | $CH_3$ | $C_2H_5$ | $C_2H_5$ | 95.5–97.0 |
| 47 | Product of Example 31 | $C_2H_5$ | $C_2H_5$ | $CH_3$ | 109–110 |
| 48 | Product of Example 32 | $CH_3$ | $CH_2CH_2OSO_2CH_3$ | $CH_3$ | 187.5–189.0 dec. |
| 49 | Product of Example 39 | $CH_3$ | $C_2H_5$ | $CH_2OCOCH_3$ | 122.5–123.5 |
| 50 | Product of Example 37 | $CH_3$ | $C_2H_5$ | $COOCH_3$ | 178.5–180.0 |

*Example 38*

Preparation of *1-ethyl-2-hydroxymethyl-5-methoxy-6-methylindole.*—A magnetically stirred mixture of 7.00 g. of methyl 1-ethyl-5-methoxy-6-methyl-2-indolecarboxylate (Example 37) and 2.7 g. of lithium aluminum hydride in 470 ml. of ether is heated at reflux temperature for 2.5 hours; stirring is continued for an additional 16 hours. Ethyl acetate (60 ml.) is added cautiously, and then 60 ml. of water is added. The bulk of the ethereal phase is decanted from the aqueous phase which is then diluted with water and extracted with ethyl acetate. The combined organic solutions are washed with saline, dried over sodium sulfate and evaporated. The residue is recrystallized from ether-petroleum ether (B.P. 30–60°) to give white needles, M.P. 103–106° C.

*Example 39*

Preparation of *2-acetoxymethyl-1-ethyl-5-methoxy-6-methylindole.*—A solution of 5.49 g. of 1-ethyl-2-hydroxymethyl-5-methoxy-6-methylindole (Example 38) and 7 ml. of acetic anhydride in 60 ml. of pyridine is kept at room temperature for 17 hours. The solution is diluted with water to a volume of about 400 ml. and chilled to give white needles, M.P. 96–97° C.

*Example 40*

Preparation of *1-ethyl-5-methoxy-2,6-dimethyl-3-indolecarboxaldehyde.*—To 200 ml. of magnetically-stirred, ice-chilled dimethylformamide is added dropwise at such a rate that the temperature remains at 0–5° C. 55 g. (32.8 ml.) of phosphorus oxychloride. The resulting solution is treated with a solution of 66.35 g. of 1-ethyl-5-methoxy-2,6-dimethylindole (Example 23) in 150 ml. of dimethylformamide at such a rate that the temperature does not exceed 50° C. The ice bath is removed and replaced by a warm water-bath, and the mixture is stirred at 35–40° C. for 1.25 hours. Cracked ice (200 ml.) is added and the mixture is transferred to a 3-l round-bottom flask containing about 300 g. of cracked ice, 200 ml. of water being used to aid in the transfer. A solution of 250 g. of sodium hydroxide in 650 ml. of water is added dropwise with mechanical stirring until about one-half of the solution has been added; the remainder of the solution is added rapidly. The resulting mixture is heated to the boiling point, diluted with water to a volume of

*Example 51*

Preparation of *3-acetyl-1-ethyl-5-methoxy-2,6-dimethylindole.*—A mechanically stirred mixture of 12.9 g. of 1-ethyl-5-methoxy-2,6-dimethylindole (Example 23) and 10 g. of sodium acetate in 300 ml. of acetic anhydride is heated at reflux temperature for 6 hours. The reaction mixture is cooled, poured onto crushed ice and stirred for 3 hours. The reaction mixture is warmed on the steam-bath and then stirred for an additional 30 minutes and then extracted with methylene chloride. The extract is successively washed with water, saturated sodium bicarbonate solution and finally with water. The organic solution is dried over anhydrous sodium sulfate and taken to dryness to give 14 g. of an oil. A sample of the oil is distilled and the fraction boiling at 150–170° C./0.2 mm. Hg is crystallized from petroleum ether (B.P. 30–60°) to give a white solid, M.P. 88–89° C.

*Example 52*

Preparation of *1-ethyl-5-hydroxy-2,6-dimethyl-3-indolecarboxaldehyde.*—A mixture of 38.4 g. of 1-ethyl-5-methoxy-2,6-dimethyl-3-indolecarboxaldehyde (Example 40) and 46.0 g. of aluminum chloride in 1 l. of xylene is mechanically stirred at reflux temperature for 5 hours. The cooled mixture is treated with cracked ice and digested to give 38.0 g. of pink solid, M.P. 246–250° C. dec. A sample is recrystallized from acetone to give cream-colored crystals, M.P. 256–259° C. dec.

*Example 53*

Preparation of *3-acetyl-1-ethyl-5-hydroxy-2,6-dimethylindole.*—A mixture of 12 g. of the crude 3-acetyl-1-ethyl-5-methoxy-2,6-dimethylindole (Example 51) and 13.1 g. of aluminum chloride in 450 ml. of xylene is mechanically stirred at reflux temperature for 5 hours. The cooled mixture is treated with cracked ice and digested to give 8.2 g. of a pink solid, M.P. 250–255° C. A sample is recrystallized from acetone to give cream colored crystals, M.P. 262–265° C. dec.

*Example 54*

Preparation of *ethyl 1-ethyl-2,6-dimethyl-4,5-dioxo-3-indolecarboxylate.*—To a mechanically stirred solution of 18.0 g. of potassium nitrosodisulfonate in 400 ml. of water and 200 ml. of M/6 potassium dihydrogen phosphate is added a solution of 2.47 g. of ethyl 1-ethyl-5-hydroxy-2,6-dimethyl-3-indolecarboxylate (Example 7) in 500 ml. of acetone. The resulting brown solution becomes purple in 5–10 min. and is allowed to stand at room temperature for 16 hours. The solution is diluted with water and extracted with methylene chloride. The combined extracts are dried over magnesium sulfate and taken to dryness. The residue crystallizes upon trituration with ether. This material is crystallized from acetone-petrolum ether (B.P. 60–70° C.) to give, in three crops, 1.545 g. of black crystals, M.P. 115–118° C.

Example 55

*Preparation of 1-ethyl-2,6-dimethyl-4,5-dioxo-3-indolecarboxaldehyde.*—To a mechanically stirred solution of 50.0 g. (0.187 mole) of potassium nitrosodisulfonate in 1440 ml. of M/6 potassium dihydrogen phosphate solution and 2510 ml. of water is added a solution of 18.75 g. (0.0864 mole) of 1-ethyl-5-hydroxy-2,6-dimethyl-3-indolecarboxaldehyde (Example 52) in 3950 ml. of hot acetone. Some solid separates, and an additional 400 ml. of acetone is added. The initially blue solution turns brown on addition of the aldehyde and becomes purple within 5 minutes. Stirring is continued at room temperature for 1 hour. The reaction mixture is then concentrated under reduced pressure, 3200 ml. of distillate being collected. The concentrate is chilled and filtered. The residue is washed well with water and air-dried to give 16.05 g. of black needles, M.P. 205–208° C. A sample is recrystallized from acetone-hexane to give black needles, M.P. 214–216° C.

Example 56

*Preparation of 3-acetyl-1-ethyl-2,6-dimethyl-4,5-dioxoindole.*—To a mechanically stirred solution of 2.05 g. of potassium nitrosodisulfonate in 153 ml. of M/6 potassium dihydrogen phosphate solution and 300 ml. of water is added a solution of 295 mg. of 3-acetyl-1-ethyl-5-hydroxy-2,6-dimethylindole (Example 53) in 300 ml. of hot acetone. The initially blue solution turns brown on addition of the indole and becomes purple within 30 minutes. Stirring is continued at room temperature for 4 hours. The solution is diluted with an equal volume of water and extracted with methylene chloride. The combined extracts are washed with saline, dried over anhydrous sodium sulfate and concentrated to small volume and filtered. The filtrate is evaporated with concomitant addition of petroleum ether (30–60° C.). Once crystallization begins, the mixture is cooled. Filtration gives 176 mg. of dark brown solid, M.P. 162–165° C. A sample is recrystallized from methylene chloride-petroleum ether (30–60° C.) to give dark brown needles, M.P. 164–166° C.

Example 57

*Preparation of ethyl 1-ethyl-4,5,7-trihydroxy-2,6-dimethyl-3-indolecarboxylate triacetate.*—To a solution of 400 mg. of ethyl 1-ethyl-2,6-dimethyl-4,5-dioxo-3-indolecarboxylate (Example 54) in 6 ml. of acetic anhydride is added 0.125 ml. of boron trifluoride etherate; the purple solution immediately turns brown. It is kept at room temperature for 1 hour, and then poured onto cracked ice. After the excess acetic anhydride hydrolyzes, the mixture is extracted with methylene chloride. The extract is taken to dryness and the amorphous residue crystallizes with ether to give 450 mg. of crystals, M.P. 155–158° C. Two recrystallizations from acetone-petroleum ether (B.P. 30–60° C.) give white crystals, M.P. 157–159° C.

Example 58

*Preparation of 1-ethyl-4,5,7-trihydroxy-2,6-dimethyl-3-indolecarboxaldehyde triacetate.*—To a magnetically stirred mixture of 10.00 g. (43.3 mmoles) of 1-ethyl-2,6-dimethyl-4,5-dioxo-3-indolecarboxaldehyde (Example 55) in 150 ml. of acetic anhydride is added 2 ml. of boron trifluoride etherate. All solid quickly dissolves and the purple mixture becomes brown and is stirred at room temperature for 1 hour. Cracked ice is added, and the mixture is stirred at room temperature until the excess acetic anhydride hydrolyzes. The resulting solid is collected by filtration and washed with water to give 12.5 g. of grey solid, M.P. 173–180° C. A sample is recrystallized from acetone-hexane to give white crystals, M.P. 194–195° C.

Example 59

*Preparation of 4,5,7-triacetoxy-3-acetyl-1-ethyl-2,6-dimethylindole enol acetate.*—To a magnetically stirred mixture of 657 mg. of 3-acetyl-1-ethyl-2,6-dimethyl-4,5-dioxoindole (Example 56) in 8 ml. of acetic anhydride is added 0.2 ml. of boron trifluoride etherate. The solid dissolves and the purple mixture becomes dark brown and is stirred at room temperature for several hours. Cracked ice is added, and the mixture is stirred until the excess acetic anhydride hydrolyzes. The resulting solid is collected by filtration and washed with water to give 888 mg. of brown solid. The crude material is triturated with cold methanol to give 467 mg. of a yellow solid, M.P. 195–200° C.

Example 60

*Preparation of 1-ethyl-5-hydroxy-2,6-dimethyl-4,7-dioxo-3-indolecarboxylic acid.*—A mixture of 2.55 g. of ethyl 1-ethyl-4,5,7-trihydroxy-2,6-dimethyl-3-indolecarboxylate triacetate (Example 57) in 100 ml. of water and 20 ml. of 25% sodium hydroxide solution is heated at reflux temperature in an atmosphere of nitrogen with magnetic stirring for 30 minutes. The undissolved solid is collected by filtration to give 0.489 g. of solid. The filtrate is treated with a stream of air for 30 minutes. This purple solution is acidified by dropwise addition of concentrated hydrochloric acid solution, and the resulting solution is extracted with methylene chloride. The extract is taken to dryness and the residue is crystallized from methylene chloride-petroleum ether (B.P. 60–70° C.) to give 1.010 g. of red needles, M.P. 220–223° C.

Example 61

*Preparation of 1-ethyl-4,5,7-trihydroxy-2,6-dimethyl-3-indolecarboxaldehyde.*—A mechanically stirred mixture of 30.10 g. (0.080 mole) of 1-ethyl-4,5,7-trihydroxy-2,6-dimethyl-3-indolecarboxaldehyde triacetate (Example 58) in 500 ml. of water and 125 ml. of 25% sodium hydroxide solution is heated at reflux temperature under nitrogen for 1 hour. All solid dissolves and the brown solution is quickly filtered to give a solution of the sodium salt of 1-ethyl-4,5,7-trihydroxy - 2,6 - dimethyl - 3 - indolecarboxaldehyde.

Example 62

*Preparation of 3-acetyl-1-ethyl-4,5,7-trihydroxy-2,6-dimethylindole.*—A magnetically stirred mixture of 53 mg. of 4,5,7-triacetoxy-3-acetyl-1-ethyl-2,6-dimethyl indole enol acetate (Example 59) in 3 ml. of water and 0.4 ml. of 25% sodium hydroxide solution is heated at reflux temperature, under nitrogen, until solution occurs. The reaction mixture is filtered to give a solution of the sodium salt of 3-acetyl-1-ethyl - 4,5,7 - trihydroxy-2,6-dimethylindole.

Example 63

*Preparation of 5-methoxy-6-methylindole.*—5-methoxy-6-methyl-2-indolecarboxylic acid (Example 35) (3.61 g., 17.6 mmoles) is heated at 260–270° C. until the melt becomes quiescent and then taken to and held briefly at 300° C. The cooled material is dissolved in ether, and this solution is washed with sodium carbonate solution, treated with activated carbon, dried over magnesium sulfate and taken to dryness. The solid is recrystallized from ether-petroleum ether to give 2.12 g. of crystals, M.P. 119–120° C.

Example 64

*Preparation of 5-methoxy-6-methyl-3-indolecarboxaldehyde.*—To 3.5 ml. of dimethylformamide is added with magnetic stirring and ice cooling 1.69 g. (11 mmoles, 1 ml.) of phosphorous oxychloride. To this solution is then added dropwise a solution of 1.61 g. (10 mmoles) of 5-methoxy-6-methylindole (Example 63) in 8 ml. of dimethylformamide. The temperature of the reaction is kept below 10° C. during the addition which requires 20 minutes. A solid separates 15 minutes after the start of the addition. Upon completion of the addition, the ice bath is removed and replaced by a warm water bath. The paste is kept at 30–35° C. with magnetic stirring for 45 minutes. Crushed ice is added to the mixture which is then treated with a solution of 4.5 g. of sodium hydroxide in 20 ml. of water. The mixture is brought to boiling and then chilled in an ice bath to give 1.74 g. of tan solid, M.P. 192–195° C.

Example 65

*Preparation of 1-ethyl-5-methoxy-6-methyl-3-indolecarboxaldehyde.*—A mixture of 1.75 g. (9.2 mmoles) of 5-methoxy-6-methyl-3-indolecarboxaldehyde (Example 64) and 30 ml. of 40% potassium hydroxide solution is heated with mechanical stirring on the steam bath. When the mixture becomes hot, all solid dissolves and 10.0 g. (65 mmoles, 8.5 ml.) of ethyl sulfate is added in five equal portions over 1 hour. The solution is allowed to cool, whereon crystals separate from the aqueous solution. The mixture is extracted with ethyl acetate, and the extract is washed with saline, dried over magnesium sulfate and evaporated. The residue crystallizes from ether-petroleum ether (B.P. 30–60° C.) to give 1.287 g. of crystals, M.P. 92–94° C.

Example 66

*Preparation of 1-ethyl-5-methoxy-6-methyl-4-nitro-3-indolecarboxaldehyde.*—To an ice chilled, magnetically stirred solution of 1.085 g. (5.0 mmoles) of 1-ethyl-5-methoxy-6-methyl-3-indolecarboxaldehyde (Example 65) in 12 ml. of concentrated sulfuric acid is added dropwise over 30 minutes a solution of 0.425 g. (5.0 mmoles) of sodium nitrate in 7 ml. of concentrated sulfuric acid. The resulting solution is stirred for an additional 45 minutes and then poured onto a cracked ice-water mixture. The solid is extracted into methylene chloride and the extract is washed to neutrality with saline, dried with magnesium sulfate and evaporated. The residue is crystallized from acetone-hexane to give 525 mg. of light yellow solid, M.P. 150–152° C.

Example 67

*Preparation of 1-ethyl-5-methoxy-2,6-dimethyl-4-nitro-3-indolecarboxaldehyde.*—In the manner described in Example 66 treatment of 1-ethyl-5-methoxy-2,6-dimethyl-3-indolecarboxaldehyde (Example 40) with sodium nitrate in sulfuric acid produces orange crystals, M.P. 155–157° C.

Example 68

*Preparation of methyl 1-ethyl-3-formyl-5-methoxy-6-methyl-4-nitro-2-indolecarboxylate.*—To a magnetically stirred solution of 10.0 g. of methyl 1-ethyl-3-formyl-5-methoxy-6-methyl-2-indolecarboxylate (Example 50) in 300 ml. glacial acetic acid is added dropwise 10 ml. of yellow fuming nitric acid; stirring is continued for one hour after completion of the addition. Water is added, and the orange solid is collected by filtration. Recrystallization from acetone-hexane gives light orange crystals, M.P. 182–184° C.

Example 69

*Preparation of methyl 1-ethyl-3-formyl-6-methyl-4,5-dioxo-2-indolecarboxylate.*—The filtrate obtained from Example 68 is extracted with methylene chloride. The combined extracts are washed with saline, dried over sodium sulfate and evaporated. The residue is recrystallized from acetone-hexane to give red needles, M.P. 207–210° C.

Examples 70–78

In the manner described in Example 69 the compounds of Table VI are obtained.

TABLE VI

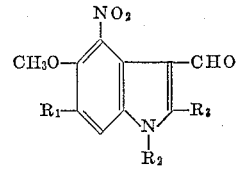

| Example No. | Starting Material | Product | | | M.P., ° C. |
|---|---|---|---|---|---|
| | | R₁ | R₂ | R₃ | |
| 70 | Product of Example 41 | CH₃ | H | CH₃ | 280 |
| 71 | Product of Example 42 | CH₃ | CH₃ | CH₃ | 183–187 |
| 72 | Product of Example 43 | CH₃ | C₃H₇ | CH₃ | 136–138 |
| 73 | Product of Example 44 | CH₃ | (CH₃)₂CH | CH₃ | Crude |
| 74 | Product of Example 45 | CH₃ | C₄H₉ | CH₃ | 127–128 |
| 75 | Product of Example 46 | CH₃ | C₂H₅ | C₂H₅ | 151–154 |
| 76 | Product of Example 47 | C₂H₅ | C₂H₅ | CH₃ | 181.0–182.5 |
| 77 | Product of Example 48 | CH₃ | CH₂CH₂OSO₂CH₃ | CH₃ | 181.5–183.0 |
| 78 | Product of Example 49 | CH₃ | C₂H₅ | CH₂OC(O)CH₃ | 198–200 |

Example 79

*Preparation of 1-ethyl-3-formyl-5-methoxy-6-methyl-4-nitro-2-indolecarboxylic acid.*—A magnetically stirred mixture of 8.0 g. of methyl 1-ethyl-3-formyl-5-methoxy-6-methyl-4-nitro-2-indolecarboxylate (Example 68) and 250 ml. of 5% sodium hydroxide is heated at reflux for 1.5 hours. The solution is cooled and acidified with concentrated hydrochloric acid solution. The precipitated solid is collected by filtration and crystallized from acetone to give yellow crystals, M.P. 216–217° C.

Example 80

*Preparation of 1-ethyl-3-formyl-5-methoxy-6-methyl-4-nitro-2-indolecarboxamide.*—To an ice-chilled, magnetically stirred solution of 2.154 g. of 1-ethyl-3-formyl-5-methoxy-6-methyl-4-nitro-2-indolecarboxylic acid (Example 79) and 1.14 ml. of triethylamine in 60 ml. of N,N-dimethylformamide is added dropwise 0.79 ml. of ethyl chlorocarbonate at such a rate that the temperature is maintained between 0–5° C. A solid separates. Ammonia gas is then passed into the reaction mixture for 10 minutes. The resulting mixture is diluted with water and cooled in an ice-bath to give a solid which is recrystallized from acetone to give white crystals, M.P. 252–254° C.

*Example 81*

*Preparation of 1-(β-fluoroethyl)-5-methoxy-2,6-dimethyl-4-nitro-3-indolecarboxaldehyde.*—A mixture of 5.00 g. of 1-(β-methanesulfonyloxyethyl)-5-methoxy-2,6-dimethyl-4-nitro-3-indolecarboxaldehyde (Example 77) and 5.00 g. of powdered potassium fluoride dihydrate in 160 ml. of methanol is placed in a stainless steel bomb and heated at 150° C. for 18 hours. The bomb is cooled, and its contents are distributed between methylene chloride and water. The organic layer is washed with saline, dried over magnesium sulfate and evaporated. The residue is recrystallized from acetone-petroleum ether (B.P. 60–70° C.) to give yellow crystals, M.P. 175–178° C.

boiling. At 30–60 second intervals 10 ml. of concentrated ammonium hydroxide solution is added until a total of 150 ml. is added. The resulting mixture is heated for 15 minutes after the last addition and then filtered. The residual cake is washed thoroughly with methylene chloride. The combined filtrate and washings are shaken well and the organic layer is separated. The aqueous phase is extracted further with methylene chloride, and the combined organic solutions are washed several times with dilute hydrochloric acid solution. The combined acid washes are neutralized by pouring onto a sodium carbonate slurry. The resulting mixture is extracted well with methylene chloride; the extracts are dried over magnesium sulfate and evaporated. The residue crystallizes from methylene chloride-petroleum ether (B.P. 30–60° C.) to give tan crystals, M.P. 150–154° C.

*Examples 84–90*

In the manner described in Example 83 the compounds of Table VII are obtained.

TABLE VII

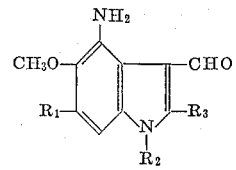

| Example No. | Starting Material | Product | | | M.P., ° C. |
|---|---|---|---|---|---|
| | | $R_1$ | $R_2$ | $R_3$ | |
| 84 | Product of Example 67 | $CH_3$ | $C_2H_5$ | $CH_3$ | 117.5–118.5 |
| 85 | Product of Example 75 | $CH_3$ | $C_2H_5$ | $C_2H_5$ | Oil |
| 86 | Product of Example 72 | $CH_3$ | $C_3H_7$ | $CH_3$ | 128–129 |
| 87 | Product of Example 74 | $CH_3$ | $C_4H_9$ | $CH_3$ | 129.5–131.0 |
| 88 | Product of Example 78 | $CH_3$ | $C_2H_5$ | $CH_2OH$ | 182.0–182.5 |
| 89 | Product of Example 78 | $CH_3$ | $C_2H_5$ | $CH_2OCCH_3$ (O) | 136–138 |
| 90 | Product of Example 80 | $CH_3$ | $C_2H_5$ | $CONH_2$ | 202–203 |

*Example 82*

*Preparation of 1-(β-acetoxyethyl)-5-methoxy-2,6-dimethyl-4-nitro-3-indolecarboxaldehyde.*—A mixture of 500 mg. of 1-(β-methanesulfonyloxymethyl)-5-methoxy-2,6-dimethyl-4-nitro-3-indolecarboxaldehyde (Example 77) and 1.00 g. of sodium acetate in 25 ml. of dimethylformamide is heated on the steam bath for 15 hours. The mixture is diluted with water, and the precipitated solid is collected by filtration and recrystallized from acetone-petroleum ether (B.P. 60–60° C.) to give crystals, M.P. 179–180° C.

*Example 83*

*Preparation of 4-amino-5-methoxy-1,2,6-trimethyl-3-indolecarboxaldehyde.*—A mechanically stirred solution of 13.15 g. of 5-methoxy-1,2,6-trimethyl-4-nitro-3-indolecarboxaldehyde (Example 71) in 875 ml. of alcohol and 375 ml. of water is heated to steam-bath temperature. A solution of 134 g. of ferrous sulfate heptahydrate in 1250 ml. of water is added, and the mixture is heated to

*Example 91*

*Preparation of 4-amino-1-(β-methanesulfonyloxyethyl)-5-methoxy-2,6-dimethyl-3-indolecarboxaldehyde.*—A mechanically stirred solution of 15.00 g. of 1-(β-methanesulfonyloxyethyl)-5-methoxy-2,6-dimethyl-4-nitro-3-indolecarboxaldehyde (Example 77) in 450 ml. of glacial acetic acid and 45 ml. of water is heated to steam-bath temperature, and 20.00 g. of iron filings are added in thirteen approximately equal portions over 2 hours. An additional 45 ml. of water is added after 45 minutes, and the reaction is heated 30 minutes after the last addition of iron filings. Water is added, and the mixture is extracted with methylene chloride. The combined extracts are washed with water, potassium carbonate solution and finally with water, dried over magnesium sulfate and evaporated. The residue is recrystallized from methylene chloride-petroleum ether (B.P. 30–60° C.) to give tan crystals M.P. 133–135° C.

*Examples 92–96*

In the manner described in Example 91 the compounds of Table VIII are obtained.

TABLE VIII

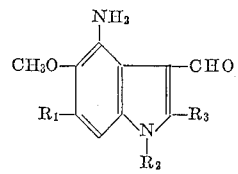

| Example No. | Starting Material | Product | | | M.P., °C. |
|---|---|---|---|---|---|
| | | R¹ | R² | R³ | |
| 92 | Product of Example 70 | CH₃ | H | CH₃ | Crude |
| 93 | Product of Example 73 | CH₃ | CH(CH₃)₂ | CH₃ | Oil |
| 94 | Product of Example 76 | C₂H₅ | C₂H₅ | CH₃ | 110.5–112.5 |
| 95 | Product of Example 81 | CH₃ | CH₂CH₂F | CH₃ | 139–141 |
| 96 | Product of Example 82 | CH₃ | CH₂CH₂OCOCH₃ | CH₃ | 178–180 |

Example 97

*Preparation of 4-amino-1-(β-azidoethyl)-5-methoxy-2,6-dimethyl-3-indolecarboxaldehyde.*—A mixture of 300 mg. of 4-amino-1-(β-methanesulfonyloxyethyl)-5-methoxy-2,6-dimethyl-3-indolecarboxaldehyde (Example 91) and 300 mg. of sodium azide in 10 ml. of dimethylformamide is heated on the steam bath for 16 hours. The resulting mixture is poured into 150 ml. of water and cooled in an ice-bath to give solid which is recrystallized from methylene chloride-petroleum ether to furnish tan crystals, M.P. 123–124° C.

Examples 98–100

In the manner described in Example 97 treatment of 4-amino-1-(β-methanesulfonyloxyethyl)-5-methoxy-2,6-dimethyl-3-indolecarboxaldehyde (Example 91) with the appropriate nucleophile gives the compounds of Table IX.

EXAMPLE IX

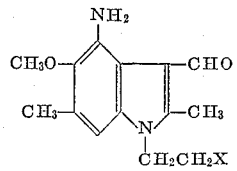

| Example No. | Nucleophile | Product X | M.P., °C. |
|---|---|---|---|
| 98 | KSCN | SCN | 190–193 |
| 99 | LiCl | Cl | 120–123 |
| 100 | NaSCH₃ [a] | SCH₃ | 128.5–130.0 |

[a] Acetone solvent.

Example 101

*Preparation of 4-amino-1-(β-hydroxyethyl)-5-methoxy-2,6-dimethyl-3-indolecarboxaldehyde.*—A solution of 2.466 g. of 1-(β-acetoxyethyl)-4-amino-5-methoxy-2,6-dimethyl-3-indolecarboxaldehyde (Example 96) in 100 ml. of methanol containing 6 ml. of 10% potassium carbonate solution is stirred at room temperature under nitrogen for 1 hour. Approximately half the solvent is removed after acidification with 0.45 ml. of acetic acid. The concentrate is diluted with 200 ml. of water and chilled to give tan needles, M.P. 157–159° C.

Example 102

*Preparation of methyl 4,5,7-triacetoxy-3-diacetoxymethyl-1-ethyl-6-methyl-2-indolecarboxylate.*—In the manner described in Example 58 treatment of methyl 1-ethyl-3-formyl-6-methyl-4,5-dioxo-2-indolecarboxylate (Example 69) with acetic anhydride and boron trifluoride etherate gives crystals, M.P. 139–149° C.

Example 103

*Preparation of 1-ethyl-3-formyl-4,5,7-trihydroxy-6-methyl-2-indolecarboxylic acid.*—In the manner described in Example 61 hydrolysis of methyl 4,5,7-triacetoxy-3-diacetoxymethyl-1-ethyl-6-methyl-2-indolecarboxylate (Example 102) produces the sodium salt of 1-ethyl-3-formyl-4,5,7-trihydroxy-6-methyl-2-indolecarboxylic acid.

Example 104

*Preparation of 1-ethyl-4,5,6,7-tetrahydro-2-methyl-4-oxoindole.*—A mixture of 33 g. of 2-acetonyl-1,3-cyclohexanedione [H. Stetter and R. Lauterbach, Ann. 652, 43 (1962)], 20 g. of ethylamine and 135 ml. of methanol is heated in a steel bomb at 150° C. for 12 hours. The methanol is removed by concentration at reduced pressure and the residual mixture is heated with 200 ml. of methylene chloride and 400 ml. of water. The organic layer is washed two times with 5% sodium hydroxide solution, once with water, then dried and concentrated. The crystalline residue is washed with cyclohexane containing a small amount of ether. Recrystallization of this residue from cyclohexane affords 18.8 g. of 1-ethyl-4,5,6,7-tetrahydro-2-methyl-4-oxoindole, M.P. 74–75° C.

Example 105

*Preparation of 2,6-dimethyl-1-ethyl-4,5,6,7-tetrahydro-4-oxoindole.*—In the manner described in Example 104 treatment of 2-acetonyl-5-methyl-1,3-cyclohexanedione [H. Stetter and R. Lauterbach, Ann. 652, 43 (1962)] with ethylamine gives white needles, M.P. 77–79° C.

Example 106

*Preparation of 1-ethyl-4-hydroxy-2-methylindole.*—A mixture of 10.5 g. of 1-ethyl-4,5,6,7-tetrahydro-2-methyl-4-oxoindole (Example 104), 2.5 g. of 10% palladium-on-charcoal and 50 ml. of cumene is heated at reflux temperature for 3 hours, then cooled and filtered. The filtrate is extracted with 100 ml. of 5% sodium hydroxide solution and this extract is layered with methylene chloride and carefully neutralized with acetic acid. The methylene chloride layer is washed with sodium bicarbonate solution, dried and concentrated and the residue is extracted with 500 ml. of boiling n-hexane. White crystals of 1-ethyl-4-hydroxy-2-methylindole form on cooling the extract. They have M.P. 98–102° C.

Example 107

*Preparation of 2,6-dimethyl-1-ethyl-4-hydroxyindole.*—In the manner described in Example 106 treatment of 2,6-dimethyl-1-ethyl-4,5,6,7-tetrahydro-4-oxoindole (Example 105) with 10% palladium-on-charcoal in cumene gives grey-white prisms, M.P. 141–143° C.

Example 108

*Preparation of 2,6-dimethyl-1-ethyl-5-hydroxymethylene-4,5,6,7-tetrahydro-4-oxoindole.*—An ice-cooled suspension of 64.8 g. of sodium methoxide in 600 ml. of benzene is treated with a solution of 88.8 g. of ethyl formate and 65.7 g. of 2,6-dimethyl-1-ethyl-4,5,6,7-tetrahydro-4-oxoindole (Example 105) in 600 ml. of benzene. The mixture is stirred at room temperature overnight, then cooled in an ice bath and treated with 1200 ml. of 5% sodium hydroxide solution. The benzene layer is extracted with an additional 10 ml. of 5% sodium hydroxide solution and the combined alkaline extracts are cooled in an ice bath, layered with 1200 ml. of benzene and acidified with 6 N hydrochloric acid. Concentration of the benzene layer affords 70.2 g. (96.1%) of grey solid that gives on recrystallization from petroleum ether greyish-white needles, M.P. 71–74° C.

Example 109

*Preparation of 2,6-dimethyl-1-ethyl-4-hydroxy-5-indolecarboxaldehyde.*—To a solution of 4.51 g. of 2,6-dimethyl-1 - ethyl - 5 - hydroxymethylene - 4,5,6,7 - tetrahydro - 4-oxoindole (Example 108) in 30 ml. of dioxane is added a solution of 4.54 g. of dichlorodicyanobenzoquinone in 30 ml. of dioxane. After one hour the mixture is filtered and the filtrate is concentrated. Recrystallization of the residue from hexane gives 2.28 g. of yellow rods, M.P. 129–130.5° C.

Example 110

*Preparation of 1-ethyl-4-hydroxy-2,5,6-trimethylindole.*—A solution of 1.09 g. of 1-ethyl-4-hydroxy-2,6-dimethyl-5-indolecarboxaldehyde (Example 109) in ethanol is treated with 1.0 g. of 10% palladium-on-carbon and shaken with hydrogen in a Parr apparatus. The mixture is filtered and the filtrate is concentrated to give a yellow oil that crystallizes from hexane, affording 412 mg. of tan solid, M.P. 98–102° C.

Example 111

*Preparation of 4-acetoxy-1-ethyl-2-methylindole.*—A solution of 4.0 g. (22.4 mmole) of 1-ethyl-4-hydroxy-2-methylindole (Example 106) in 75 ml. of water containing 1.35 g. (33.3 mmole) of sodium hydroxide is treated with 3.4 g. (33.3 mmole) of acetic anhydride and 3.0 g. (33.3 mmole) of sodium acetate. After 20 minutes the mixture is filtered and the solid is dissolved in methylene chloride. This solution is washed two times with sodium bicarbonate solution, dried and concentrated and the dark oily residue is extracted with 40 ml. of boiling n-hexane. On cooling, this extract first gives an oil. The mother liquor is decanted from this oil, affording on further cooling 4-acetoxy-1-ethyl-2-methylindole, white crystals, M.P. 71–73° C.

Example 112

*Preparation of 4-acetoxy-2,6-dimethyl-1-ethylindole.*—In the manner described in Example 111 treatment of 2,6-dimethyl-1-ethyl-4-hydroxyindole (Example 107) with acetic anhydride gives off-white solid, M.P. 61–63° C.

Example 113

*Preparation of 4-acetoxy-1-ethyl-2,5,6-trimethylindole.*—In the manner described in Example 111 treatment of 1-ethyl-4-hydroxy-2,5,6-trimethylindole (Example 110) with acetic anhydride gives pale yellow crystals, M.P. 113–114.5° C.

Example 114

*Preparation of 4-acetoxy-1-ethyl-2-methyl-3-indolecarboxaldehyde.*—To an ice-cooled mixture of 2.0 g. (13.7 mmole) of phosphorous oxychloride and 15 ml. of N,N-dimethylformamide is added dropwise a solution of 3.20 g. (13.7 mmole) of 4-acetoxy-1-ethyl-2-methylindole (Example 111) in 15 ml. of N,N-dimethylformamide. After 90 minutes the resulting yellow solution is poured onto a mixture of ice and 10% sodium carbonate solution. The crystalline solid that forms is washed well with water, dissolved in methylene chloride, washed with sodium bicarbonate solution, dried and concentrated under reduced pressure. Crystallization of the residue from methanol affords white needles, M.P. 165–168° C.

Example 115

*Preparation of 4-acetoxy-2,6-dimethyl-1-ethyl-3-indolecarboxaldehyde.*—In the manner described in Example 114 treatment of 4-acetoxy-2,6-dimethyl-1-ethylindole (Example 112) with phosphorous oxychloride and N,N-dimethylformamide gives off-white fine needles, M.P. 168–171° C.

Example 116

*Preparation of 4-acetoxy-1-ethyl-2,5,6-trimethyl-3-indolecarboxaldehyde.*—In the manner described in Example 114 treatment of 4-acetoxy-1-ethyl-2,5,6-trimethylindole (Example 113) with phosphorous oxychloride and N,N-dimethylformamide gives yellow needles, M.P. 165–168° C.

Example 117

*Preparation of 1-ethyl-4-hydroxy-2-methyl-3-indolecarboxaldehyde.*—A mixture of 3.14 g. (12 mmole) of 4-acetoxy - 1 - ethyl - 2 - methyl - 3 - indolecarboxaldehyde (Example 114), 200 ml. of methanol and 60 ml. of 5% sodium hydroxide solution is stirred and gently warmed until all solid dissolves. It is then cooled, diluted with 200 ml. of water and carefully neutralized with acetic acid. The precipitate that forms is washed well with water, dissolved in methylene chloride solution, washed with sodium bicarbonate solution, dried and concentrated under reduced pressure. Crystallization of the residue from methanol with charcoal decolorization affords 1.16 g. of white needles, M.P. 169–170° C.

Example 118

*Preparation of 2,6-dimethyl-1-ethyl-4-hydroxy-3-indolecarboxaldehyde.*—In the manner described in Example 117 treatment of 4-acetoxy-2,6-dimethyl-1-ethyl-3-indolecarboxaldehyde (Example 115) with sodium hydroxide solution gives yellow needles, M.P. 178–180° C.

Example 119

*Preparation of 1-ethyl-4-hydroxy-2,5,6-trimethyl-3-indolecarboxaldehyde.*—In the manner described in Example 117 treatment of 4-acetoxy-1-ethyl-2,5,6-trimethyl-3-indolecarboxaldehyde (Example 116) with sodium hydroxide solution gives yellow needles, M.P. 162–163.5° C.

Example 120

*Preparation of 1-ethyl-2-methyl-4,7-dioxoindole.*—A solution of 218 mg. (1.25 mmole) of 1-ethyl-4-hydroxy-2-methylindole (Example 106) is added to a solution of 1.34 g. (5 mmole) of potassium nitrosodisulfonate in 80 ml. of M/18 potassium dihydrogen phosphate. After one hour the resulting mixture is diluted with water and extracted with methylene chloride. This extract is washed with water, dried, and concentrated and the residue is redissolved in methylene chloride and passed through a column filled with a magnesia-silica gel adsorbent. Concentration of the orange eluate gives on concentration 168 mg. (68%) of scarlet prisms, M.P. 86–87° C.

Example 121

*Preparation of 4,7-diacetoxy-1-ethyl-2-methylindole.*—To an ice-cooled mixture of 1.13 g. (6.0 mmole) of 1-ethyl-2-methyl-4,7-dioxoindole (Example 120), 1.1 g. of zinc dust and 10 ml. of acetic anhydride is added 0.5 ml. of pyridine. The resulting mixture is kept at room temperature 30 minutes, then filtered into sodium bicarbonate solution. After the excess anhydride is hydrolyzed the mixture is extracted with methylene chloride. This extract is washed with sodium bicarbonate solution, dried and concentrated to afford 1.23 g. (75%) of yellow oil.

Example 122

*Preparation of 4,7-diacetoxy-1-ethyl-2-methyl-3-indolecarboxaldehyde.*—To an ice-cooled mixture of 690 mg. (4.5 mmole) of phosphorous oxychloride and 5 ml. of N,N-dimethylformamide is added dropwise a solution of 1.23 g. (4.5 mmole) of 4,7-N,N-dimethylformamide. The mixture is stirred one hour at this temperature and 30 minutes at room temperature, then poured into a mixture of 10% sodium carbonate solution and ice. The solid that forms is washed with water, dissolved in methylene chloride solution, washed with sodium bicarbonate solution, dried and concentrated. After the residue crystallizes it is washed with methanol, then recrystallized from methanol. This procedure gives 634 mg. (47%) of very pale blue prisms, M.P. 124–126° C.

Example 123

*Preparation of 1-ethyl-5-hydroxymethylene-2-methyl-4-oxo-4,5,6,7-tetrahydroindole.*—An ice-cooled suspension of 1.08 g. (20 mmole) of sodium methoxide in 10 ml. of dry benzene, under nitrogen, is treated with a solution of 1.48 g. (20 mmole) of ethyl formate in 5 ml. of benzene and a solution of 885 mg. (5 mmole) of 1-ethyl-2-methyl-4-oxo-4,5,6,7-tetrahydroindole (Example 104) in 10 ml. of benzene. The mixture is stirred at room temperature overnight, then cooled in an ice bath and treated with 20 ml. of 5% sodium hydroxide solution. The benzene layer is extracted with an additional 10 ml. of 5% sodium hydroxide solution and the combined alkaline extracts are cooled in an ice bath, layered with 20 ml. of benzene and acidified with 6 N hydrochloric acid. A pale yellow solid separates. This solid is combined with an additional quantity of solid obtained by concentrating the benzene layer, and recrystallized from methanol. This procedure affords white prisms, M.P. 82–90° C.

Example 124

*Preparation of 2,5-dimethyl-1-ethyl-4-oxo-4,5,6,7-tetrahydroindole.*—A mixture of 1.0 g. of 1-ethyl-5-hydroxymethylene-2-methyl-4-oxo-4,5,6,7-tetrahydroindole (Example 123), 3.0 g. of powdered potassium carbonate, 30 ml. of acetone and 4 ml. of methyl iodide is stirred at room temperature overnight. It is then concentrated and the residue is treated with water and methylene chloride. The organic layer is washed with 1% sodium hydroxide solution and brine, dried and concentrated, affording 2,5-dimethyl-1-ethyl-5-formyl-4-oxo-4,5,6,7-tetrahydroindole as a pale yellow oil. Without further purification this oil is converted to the deformylated product by heating it with 270 mg. of sodium methoxide in 20 ml. of methanol at reflux temperature for 2 hours. The resulting solution is concentrated and the residue is treated with water and methylene chloride. The organic layer is washed with water, dried and concentrated and the residue is purified by adsorption chromatography. This procedure gives 2,5-dimethyl-1-ethyl-4-oxo-4,5,6,7-tetrahydroindole as white crystals, M.P. 44–47° C.

Example 125

*Preparation of 2,5-dimethyl-1-ethyl-4-hydroxyindole.*—In the manner described in Example 106 treatment of 2,5-dimethyl-1-ethyl-4-oxo-4,5,6,7-tetrahydroindole (Example 124) with palladium-on-charcoal in cumene gives white needles, M.P. 110–112° C.

Example 126

*Preparation of 4-acetoxy-2,5-dimethyl-1-ethylindole.*—Treatment of 2,5-dimethyl-1-ethyl-4-hydroxyindole (Example 125) with sodium hydroxide, acetic anhydride and sodium acetate in the manner described in Example 111 gives a colorless oil.

Example 127

*Preparation of 4-acetoxy-2,5-dimethyl-1-ethyl-3-indolecarboxaldehyde.*—In the manner described in Example 114 treatment of 4-acetoxy-2,5-dimethyl-1-ethylindole (Example 126) with phosphorous oxychloride and dimethylformamide gives pale yellow crystals, M.P. 145–147° C.

Example 128

*Preparation of 2,5-dimethyl-1-ethyl-4-hydroxy-3-indolecarboxaldehyde.*—In the manner described in Example 117 treatment of 4-acetoxy-2,5-dimethyl-1-ethyl-3-indolecarboxaldehyde (Example 127) with methanolic sodium hydroxide gives pale yellow crystals, M.P. 133–135° C.

Example 129

*Preparation of 1-ethyl-4,7-dihydroxy-2-methyl-3-indolecarboxaldehyde.*—A mixture of 606 mg. (2 mmole) of 4,7 - diacetoxy-1-ethyl-2-methyl-3-indolecarboxaldehyde (Example 122), 80 mg. (2 mmole) of sodium hydroxide and 10 ml. of methanol is stirred under nitrogen for 10 minutes. This yields a solution of the sodium salt of 1-ethyl-4,7-dihydroxy-2-methyl-3-indolecarboxaldehyde.

What is claimed is:

1. A compound of the formula:

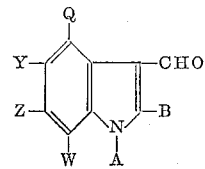

wherein A is selected from the group consisting of hydrogen, lower alkyl, ω-(hydroxy)lower alkyl, ω-(lower alkylsulfonyloxy)lower alkyl, ω-(halo)lower alkyl, ω-(azido) lower alkyl, ω-(thiocyano)lower alkyl, ω-(lower alkanoyloxy)lower alkyl and ω-(lower alkylthio)lower alkyl; B is selected from the group consisting of hydrogen, lower alkyl, lower alkoxycarbonyl, carboxy, carboxamido, lower alkanoyloxymethyl and hydroxymethyl; Q is selected from the group consisting of nitro, amino, hydroxy and lower alkanoyloxy; Y is selected from the group consisting of hydrogen, hydroxy, lower alkyl and lower alkoxy; Z is selected from the group consisting of hydrogen and lower alkyl; and W is selected from the group consisting of hydrogen, hydroxy and lower alkanoyloxy; with the proviso that when Q is nitro, then Y is lower alkoxy.

2. 1 - ethyl-4,7-dihydroxy-2-methyl-3-indolecarboxaldehyde.

3. 4,7 - diacetoxy - 1-ethyl-2-methyl-3-indolecaboxaldehyde.

4. 4-acetoxy-1-ethyl-2-methyl-3-indolecarboxaldehyde.

5. 1-ethyl-4-hydroxy-2-methyl-3-indolecarboxaldehyde.

6. 1 - ethyl-4-hydroxy-2,6-dimethyl-3-indolecarboxaldehyde.

7. 1 - ethyl-4,5,7-trihydroxy-2,6-dimethyl-3-indolecarboxaldehyde.

8. 1-ethyl-3-formyl-4,5,7-trihydroxy-6-methyl-2-indolecarboxylic acid.

9. 1 - (β - methanesulfonyloxyethyl)-5-methoxy-2,6-dimethyl-4-nitro-3-indolecarboxaldehyde.

10. 4 - amino - 1 - (β-methanesulfonyloxyethyl)-5-methoxy-2,6-dimethyl-3-indolecarboxaldehyde.

11. 5 - methoxy - 2,6-dimethyl-4-nitro-3-indolecarboxaldehyde.

12. 4 - amino - 5 - methoxy - 2,6-dimethyl-3-indolecarboxaldehyde.

References Cited by the Examiner

UNITED STATES PATENTS 3,042,684   7/1962   Young et al. _____ 260—34

FOREIGN PATENTS 869,775   6/1961   Great Britain.

OTHER REFERENCES

Da Settimo: Gazz. Chim. Ital., vol. 92, 1962, pp. 156.

Weissberger: Ed., Technique of Organic Chemistry, vol. II, Interscience Publishers, Inc., New York, 1956, pages 114–116 and 169–171.

IRVING MARCUS, *Primary Examiner.*

H. R. JILES, *Examiner.*